United States Patent [19]

Miksitz

[11] 4,411,377

[45] Oct. 25, 1983

[54] SPIRAL SCOOP ROTARY PLOW FEEDER

[75] Inventor: Frank J. Miksitz, Phillipsburg, N.J.

[73] Assignee: UFI Engineering & Manufacturing Co., Inc., Bethlehem, Pa.

[21] Appl. No.: 291,765

[22] Filed: Aug. 10, 1981

[51] Int. Cl.³ .............................................. B65G 65/48
[52] U.S. Cl. ..................................... 222/342; 198/778
[58] Field of Search .............. 222/310, 411, 342, 367; 198/658, 778; 414/304, 325

[56] References Cited

U.S. PATENT DOCUMENTS

| | | | |
|---|---|---|---|
| 2,530,181 | 11/1950 | Schilling | 222/342 X |
| 2,814,399 | 11/1957 | McIlhenny et al. | 198/778 X |
| 2,981,522 | 4/1961 | Spragens | 222/342 X |

Primary Examiner—Stanley H. Tollberg

Attorney, Agent, or Firm—Cushman, Darby & Cushman

[57] ABSTRACT

A rotary plow feeder for feeding granular material downwardly through a feed aperture in the bottom of a bin, hopper or other housing in the form of an annular stream comprises a rotary scoop disposed above and close to the feed aperture, the scoop including at least one plow blade continuously and gently curved in the form of a spiral and extending essentially around the whole periphery of the feed aperture and a cover or shroud disposed above and connected to the blade. The outer end of the blade is disposed in contact with or close to the side wall of the housing, and the inner end of the blade is disposed adjacent the feed aperture at a distance therefrom sufficient to permit granular material to be moved into position around the entire periphery of the feed aperture.

5 Claims, 4 Drawing Figures

SPIRAL SCOOP ROTARY PLOW FEEDER

This invention relates to rotary plow feeders for feeding granular material downwardly, with gravity assist, through a feed aperture in the lower end of a bin, hopper or the like.

BACKGROUND AND PRIOR ART

Rotary plow feeders of various designs have been in use for many years. In general such feeders include a bin, hopper or other container for granular material having a bottom wall provided with a central feed aperture and a rotary plow device located above the feed aperture and close to the bottom wall. Rotation of the plow device about the vertical axis of the feed aperture results in engagement of the granular material with the plow device which is shaped to urge the granular material by a scooping action toward the feed aperture. The material is thus pushed over the edge of the feed aperture to fall by gravity from the container.

A search conducted with respect to the present development identified U.S. Pat. Nos. 217,628, 243,716, 371,881, 1,856,361, 3,036,745 and 4,020,980, of which the first three were considered to be more relevant than the others.

SUMMARY OF THE INVENTION

The feeder of the present invention combines several features, particularly a specially shaped scoop, to provide efficient flow of granular material uniformly and simultaneously over essentially the whole of the periphery of the feed aperture during rotation of the plow blade. By simultaneously is meant that material flows over essentially all of the periphery of the aperture at any given time in the form of an annular stream, rather than over only a portion of the periphery. The characteristics of uniform flow and annular flow result in large measure from the use of a plow blade which is continuously curved in spiral form along a path of essentially 360° so that it essentially completely surrounds the feed aperture. A cover plate or shroud plate overlies and is connected to the plow blade so that a scoop cavity is formed by the plate, the blade and the bottom of the container.

Rotary movement of the scoop about the axis of the spiral, which coincides with the axis of the feed aperture, causes granular material to flow smoothly between the end portions of the plow blade into the scoop cavity. The operation is efficient in that there is little or no pushing of material ahead of the scoop with consequent generation of friction forces which do not contribute to the feeding operation. Rather, the material once in the scoop cavity is gradually pushed inwardly toward the feed aperture along essentially the entire periphery, with the resulting friction forces contributing directly to the feeding operation.

It is important that during feeding the direction of movement of the bulk material not be changed abruptly, as this tends to produce the above-mentioned pushing of material ahead of the scoop, i.e. backsliding of the material in the direction of rotation of the scoop and consequent reduced efficiency. Therefore, the plow blade should not be sharply curved as is typical of prior art plow feeders, such as those described in U.S. Pat. Nos. 217,628, 243,716 and 371,881. The curved plow blades described in those patents are essentially circular over a substantial portion of their length; even though the outer end portions of those blades may be spirally curved the path followed by granular material will change direction rather abruptly with the result that backsliding will occur and a significant amount of material will be pushed around in a circle in the lower end of the feeder housing instead of being plowed radially toward the discharge opening.

Backsliding is avoided in the present invention by a combination of features including the curvature of the plow blade, the size of the feed aperture relative to the largest horizontal dimension of the scoop, the disposition of the plow blade relative to the feed aperture and the relationship between the largest horizontal dimension of the scoop to the diameter of the housing at the location of the scoop entry. The preferred curvature of the plow blade is, as previously mentioned, a continuous gentle spiral from one end to the other. Tangents drawn at right angles to radii of the spiral at the plow blade should lie outside the plow blade rather than inside, because when the former feature is present the curvature of the blade is sufficiently gradual to produce the desired feeding action. A suitable curvature for the plow blade is an involute curve. The size of the feed aperture should be a small enough relative to the largest horizontal dimension of the scoop to provide a space between the inner end portion of the blade and the feed aperture. The horizontal dimension of the space should be sufficient to allow the granular material to be moved into that space and then uniformly over the edge of the feed aperture adjacent the inner end portion of the blade. If the feed aperture is too large (or if the scoop is too small) the material will be pushed over the edge of the feed aperture before it reaches the inner end of the blade, and an annular discharge stream will not be produced. Bulk material on the inner shelf also acts as a seal to prevent flushing of powder materials in certain applications when bulk materials are aerated.

When the above relationships are present, the horizontal dimension of the scoop will inherently be a substantial proportion of the horizontal dimension of the feeder housing at the location of the scoop. For many feeding operations the outer end of the scoop should be in sliding contact with the side wall of the housing to prevent jamming of material between the housing and the scoop entry. This sliding contact can be effected by providing a resilient outer end portion on the plow blade.

It is important that the scoop include a cover or shroud plate that rotates with the blade. The resulting scoop cavity, having a closed top, performs a two-stage operation. First, the scoop cuts through the granular material to envelop and shroud a mass of the material and to separate the mass from the bulk material in the housing without pushing any of the bulk material ahead of the scoop. Second, the separated mass is gradually plowed toward the whole of the periphery of the feed aperture. Equally important is the agitating effect of the rotary scoop which prevents arching of granular material above the rotary scoop area. Arching should be avoided because when present it interrupts the feeding operation.

DETAILED DESCRIPTION

Figure 1:
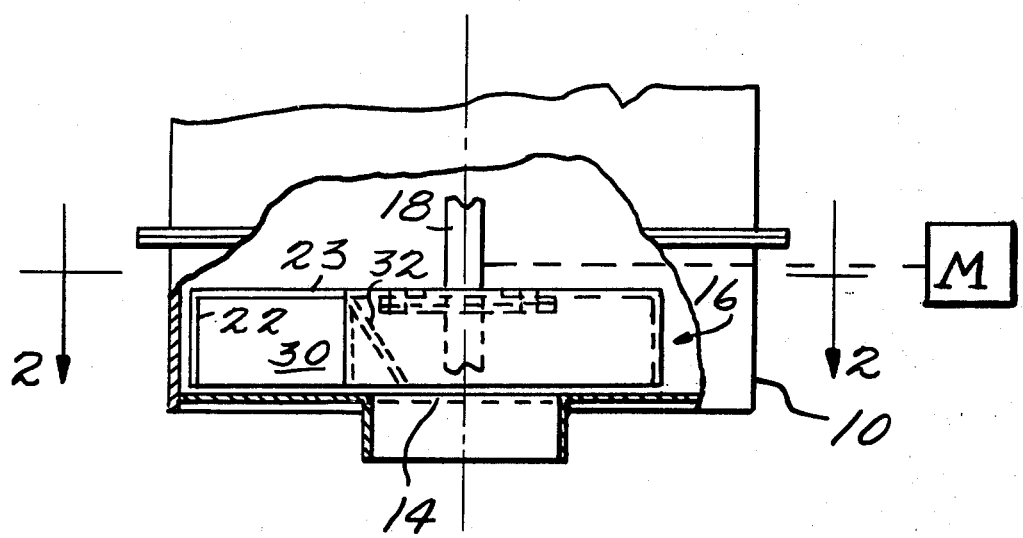
FIG. 1 is an elevational view, partly broken away, of a feeder embodying the principles of the present invention.

FIG. 1 illustrates a bin, hopper or other container having at its lower end a cylindrical feeder housing side wall 10 and a bottom wall 12 provided with a central circular feed aperture 14. A rotary scoop 16 embodying the principles of the invention is supported above the feed aperture 14 by a drive shaft 18 which is coaxial with the axis of scoop 16 and the feed aperture 14. The shaft 18 is rotatably driven by a motor 20 which may be located either above the scoop 16, as shown, or below the bottom wall 12.

The scoop 16 includes a curved plow blade 22 and a cover or shroud plate 23 fixed to the upper edge of the blade 22 so as to rotate therewith. The blade 22 is spirally curved along its entire length, the spiral being a gradual one such that tangents at right angles to radii lie essentially outside the periphery of the scoop as shown at $T_1$, $T_2$, $T_3$ etc. in FIG. 2. The illustrated curvature is similar to an involute curve. The blade 22 should extend completely around the feed aperture 14; in the illustrated embodiment the blade 22 extends somewhat more than 360°. The innermost end 24 of the blade 22 terminates quite close to the periphery of the feed aperture 14 and at the same time there is a space 26 between the blade 22 and the periphery located at 360° or more (beginning at the outer end 28 of the blade 22) so that granular material can surround the aperture 14 before being plowed over the edge of the aperture 14.

To prevent flushing of particularly pourable granular material through the mouth 30 of the scoop 16 and through the feed aperture 14 the innermost end of the plow blade can be extended spirally somewhat further than is necessary for plowing, and this end can be sloped to provide an edge 32 which faces upwardly and in the direction of rotation of the plow 16.

Figure 2:
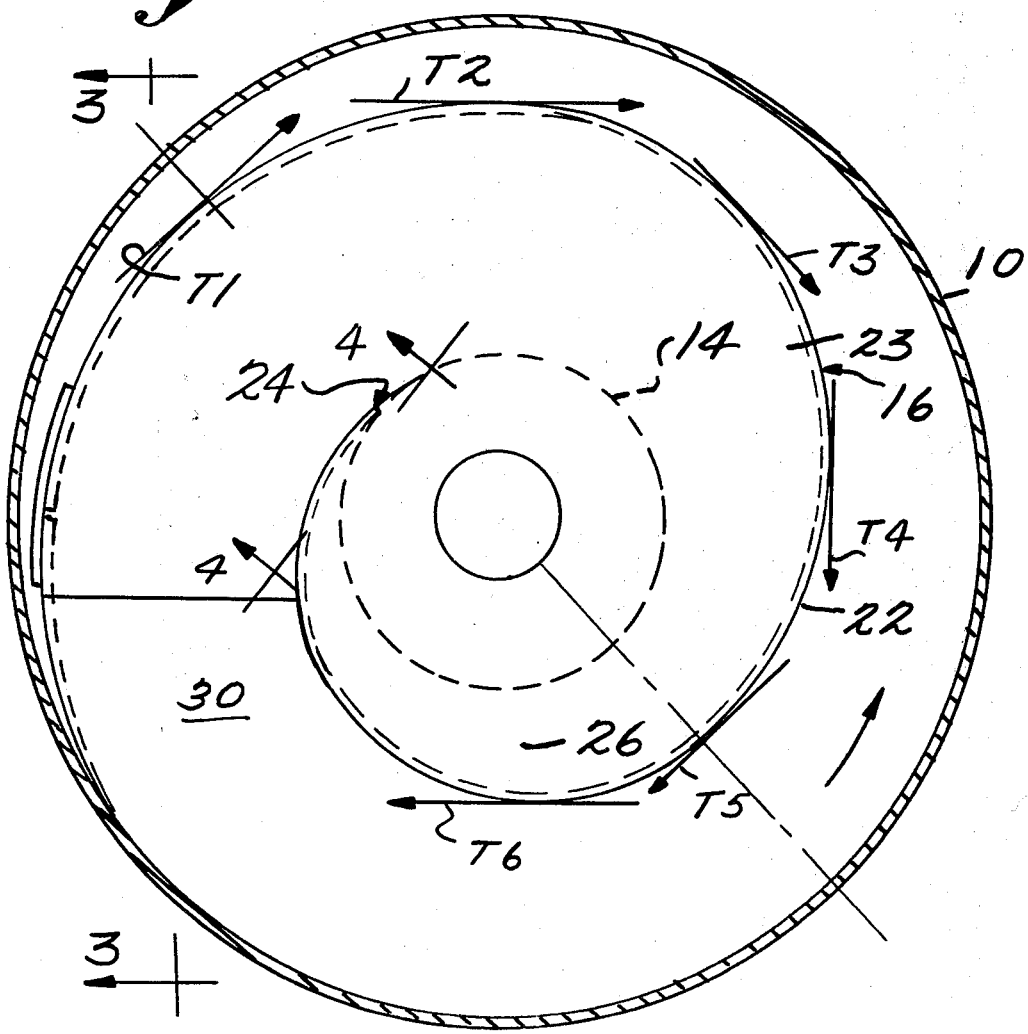
FIG. 2 is a horizontal sectional view, on an enlarged scale, taken on the line 2—2 of FIG. 1.
Figure 3:
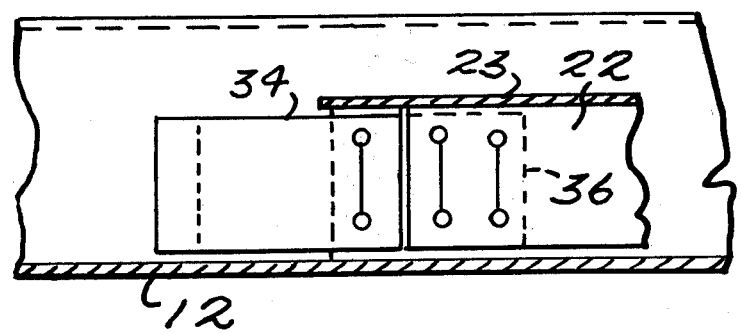
FIG. 3 is a fragmentary sectional view taken on the line 3—3 of FIG. 2.
Figure 4:
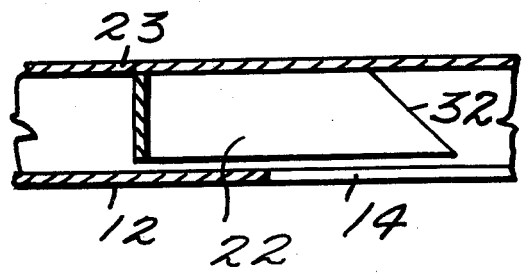
FIG. 4 is a fragmentary sectional view taken on the line 4—4 of FIG. 2.

To prevent jamming of certain kinds of granular material between the outer leading end of the plow blade 22, this outer end may be disposed in sliding contact with the housing side wall 10. A particularly suitable arrangement is one in which the outer end is resilient and biased toward the wall 10. This can be accomplished by having the outer end portion 34 of the blade separate from the remainder of the blade 22 and by attaching the end portion 34 to the remainder by means of a flat spring steel plate 36 riveted to both parts. The thus resiliently mounted end portion 34 may project beyond the shroud 23 in the direction of scoop rotation as shown in FIG. 2.

In operation of the feeder the scoop 16 is rotated counterclockwise about the axis of the spiral plow blade 22. Granular material in the feeder housing is enveloped by the mouth 30 of the scoop 16 and is eased, gradually to the entire periphery of the feed aperture 14. The tangential force components at the tangents $T_1$, $T_2$ etc. on the periphery of the blade lie outside that periphery and this indicates a low sliding force along the blade 22. Therefore, the flow of material is smooth, without backsliding in the direction of scoop rotation, because the material is being enveloped in a gradual sweeping motion and gradually moves toward the feed aperture along the whole periphery thereof. More specifically, there is relatively high friction between the granular material and the bottom wall and at any given point along the blade 22 there is relatively low friction between that point and the granular material. The high essentially static bottom-wall friction is sufficient to overcome the lower sliding friction at the concave surface of the blade, and as a result there is no tendency for the sweeping action of the blade 22 to move any of the material in the direction of scoop rotation. That is, the only movement of the material is inwardly toward the feed aperture 14. Consider, for example, the conditions at start-up, with an empty scoop cavity within the scoop 16 and with the scoop 16 embedded in the stationary bulk material in the housing. Upon counterclockwise rotation of the scoop 16, the mouth 30 of the latter cuts into the stationary material without causing any movement of the material in the direction of scoop rotation. The first material to be contacted by the concave surface of the blade 22 will begin to be urged radially inwardly and some of this material will be pushed over the edge of the feed aperture 14 beginning at the inner end of the blade, i.e. about 11 o'clock in FIG. 2. However, as the spiral curvature of the blade 22 is gradual the scoop will rotate approximately 360° without discharging all of the initially enveloped material. That is, at the end of the first revolution of the scoop 16 there will be a mass of granular material disposed along the entire periphery of the feed aperture, including the space adjacent the inner end 24 of the blade 22, this mass of material having been moved radially by the blade but not moved in the direction of blade rotation. At the beginning of the second revolution of the scoop 16, and thereafter, granular material will be pushed over the entire periphery of the feed aperture continuously and uniformly, thereby forming a uniform downwardly flowing annular stream.

What is claimed is:

1. A rotary plow feeder for feeding granular material downwardly with gravity assist through a feed aperture in the bottom wall of a container having a generally circular side wall adjacent the bottom, the feeder comprising: a rotary scoop disposed above and close to the aperture, the scoop including a plow blade which is continuously curved in a generally spiral path along essentially its entire length about an axis coinciding with the axis of the aperture and which extends essentially around the whole of the periphery of the aperture, the outer end of the plow blade being disposed close to the container side wall and the inner end of the plow blade being disposed adjacent the aperture; and a shroud plate overlying and connected to the plow blade so that the shroud plate, plow blade and container bottom form a scooping cavity into which granular material flows, during rotation of the scoop about the axis of the spiral, from the container along a path located between the end portions of the plow blade and from which granular material flows uniformly and simultaneously over essentially the whole of the periphery of the feed aperture in the form of an annular stream.

2. A rotary plow feeder as in claim 1 wherein the outer end of the plow blade is in sliding contact with the side wall of the container.

3. A rotary plow feeder as in claim 2 wherein the outer end portion of the plow blade is resilient and is biased toward the side wall of the container.

4. A rotary plow feeder as in any one of claims 1, 2 or 3 wherein the inner end of the plow blade has an edge which is inclined upwardly and in the direction of travel of the blade.

5. Apparatus for feeding granular material comprising: a container for holding the granular material, said container having a generally circular side wall and a bottom wall which has a feed aperture therethrough; and a rotary scoop disposed above and close to said feed aperture, said scoop having a top wall, an open bottom and a side wall which together with said bottom wall of said container form a cavity which is in communication with said feed aperture around the entire periphery thereof, said scoop side wall being curved in a generally spiral path along essentially its entire length about an axis coinciding with the axis of the feed aperture and which extends essentially around the whole of the periphery of the feed aperture, said side wall having an outer end disposed close to the container side wall and an inner end disposed adjacent but spaced from said feed aperture, the arrangement being such that, during rotation of said scoop about the axis of the spiral, granular material is urged by said scoop side wall in a radially inward direction but is not moved in the direction of scoop rotation whereby the granular material flows from the container uniformly and simultaneously over essentially the whole of the peripheral edge of said feed aperture in the form of an annular stream.

* * * * *